Patented June 19, 1928.

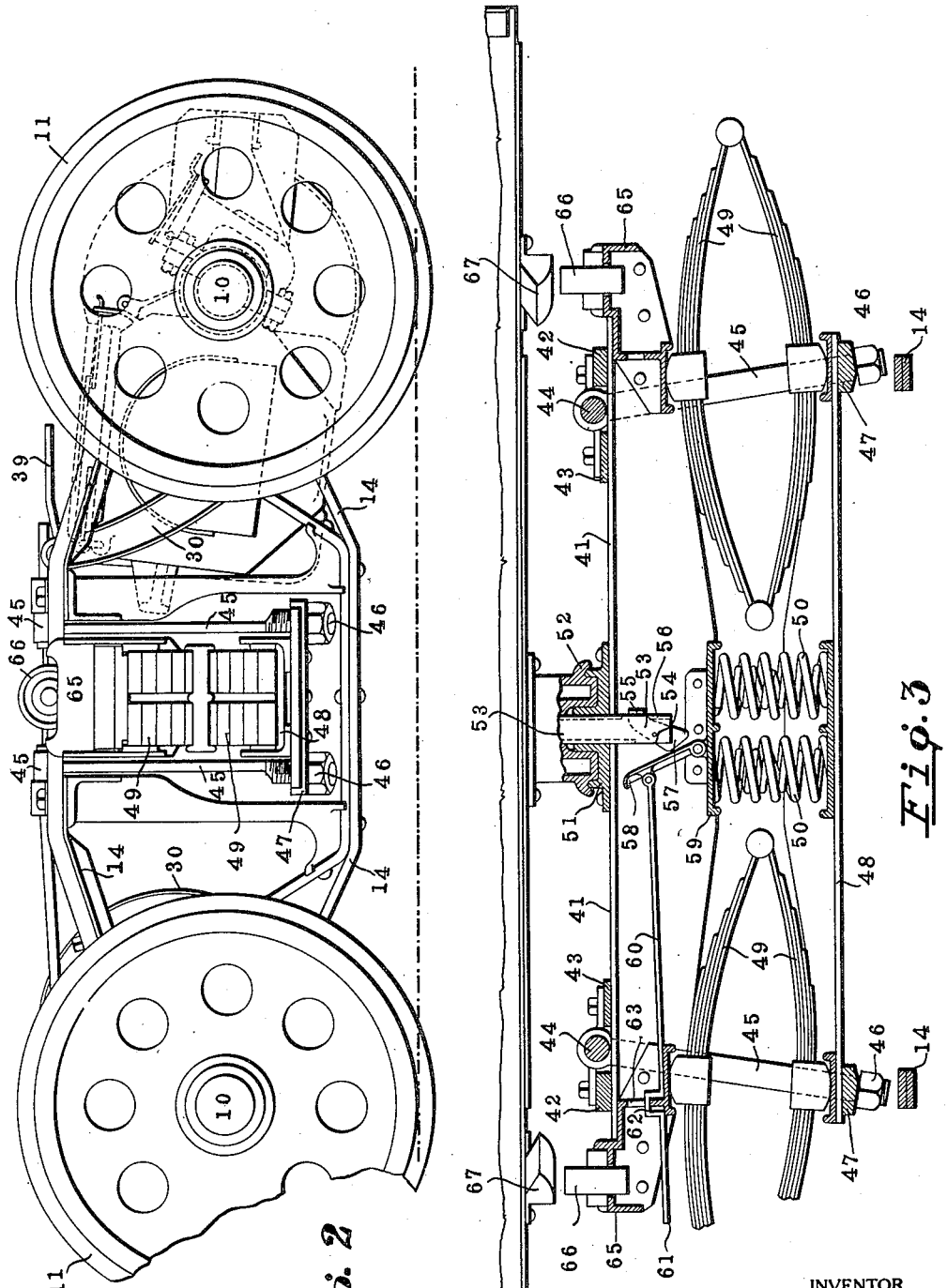

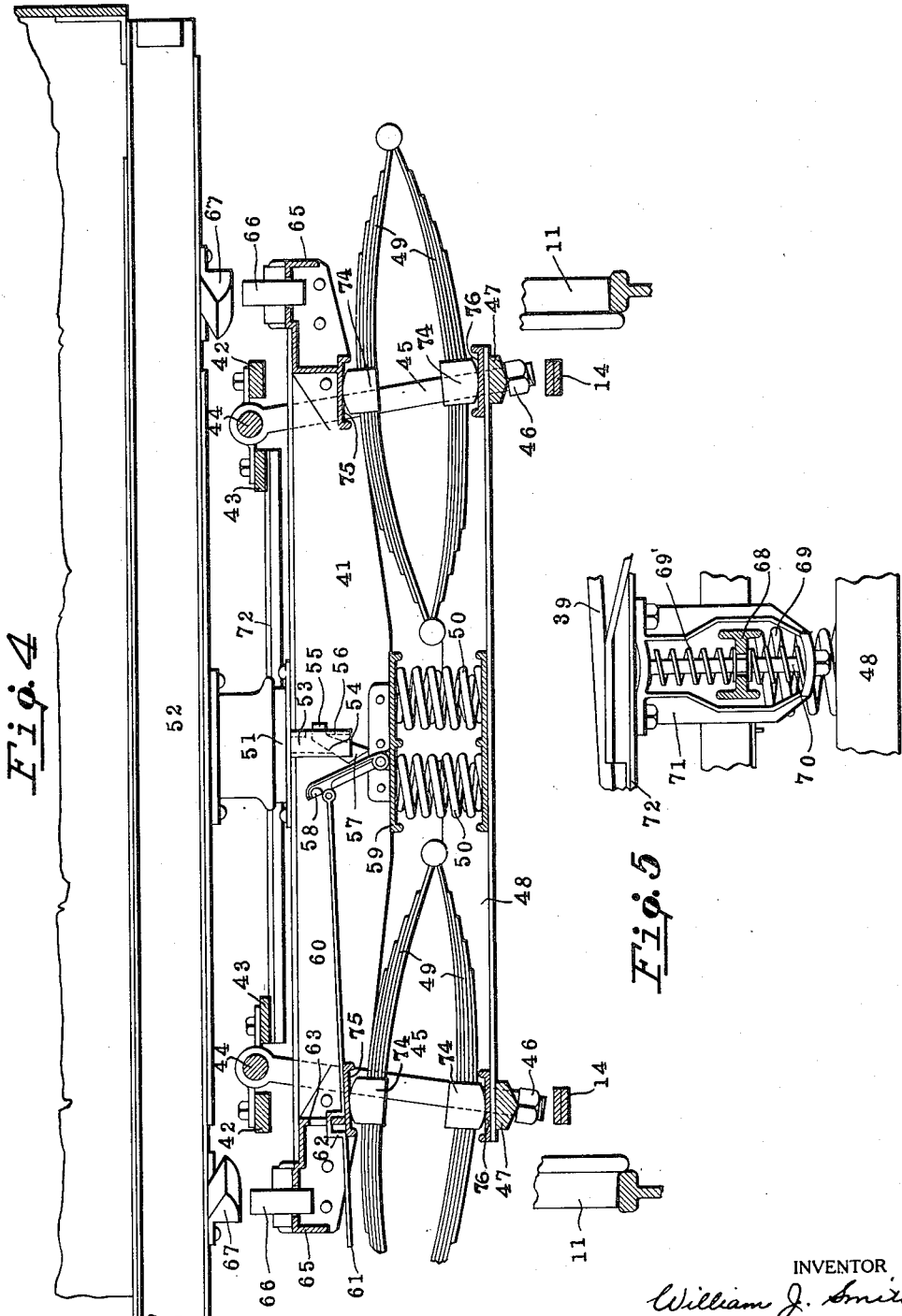

1,674,183

UNITED STATES PATENT OFFICE.

WILLIAM JUDSON SMITH, OF ST. PAUL, MINNESOTA, ASSIGNOR OF ONE-THIRD TO HORACE LOWRY, OF MINNEAPOLIS, MINNESOTA, AND ONE-THIRD TO ALPHONSUS L. DRUM, OF CHICAGO, ILLINOIS.

RAILWAY-CAR TRUCK.

Original application filed November 29, 1924, Serial No. 752,857. Divided and this application filed June 8, 1925. Serial No. 35,590.

This invention relates to railway car trucks and more particularly to the construction for supporting the car.

This invention has for its object generally to provide an improved construction, and an arrangement of parts which is efficient, economical and readily manufactured.

A more specific object of the invention is to provide a truck frame with an arrangement whereby additional springs may be inserted so that the truck may be adapted to carry substantially any range of loads desired without altering its construction.

Another object of the invention is to provide an arrangement for securing the truck to the car so that it may be readily attached to and detached from the car, but not liable to accidental displacement.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

This application is a division of my copending application, Serial No. 752,857, filed November 29, 1924.

For a fuller understanding of the nature and objects of the invention reference should be had to the following detailed description taken in connection with the accompanying drawing, in which:

Fig. 2 is a side elevation of the truck shown in Fig. 1;

Fig. 3 is a transverse sectional detailed view showing the arrangement admitting of the use of any desired number of springs in constructing the car truck;

Fig. 4 is a view similar to Fig. 3 but shows the position of the parts when the springs are depressed by a loaded car; and Fig. 5 is a fragmentary sectional view showing a detail of construction.

Figure 1:
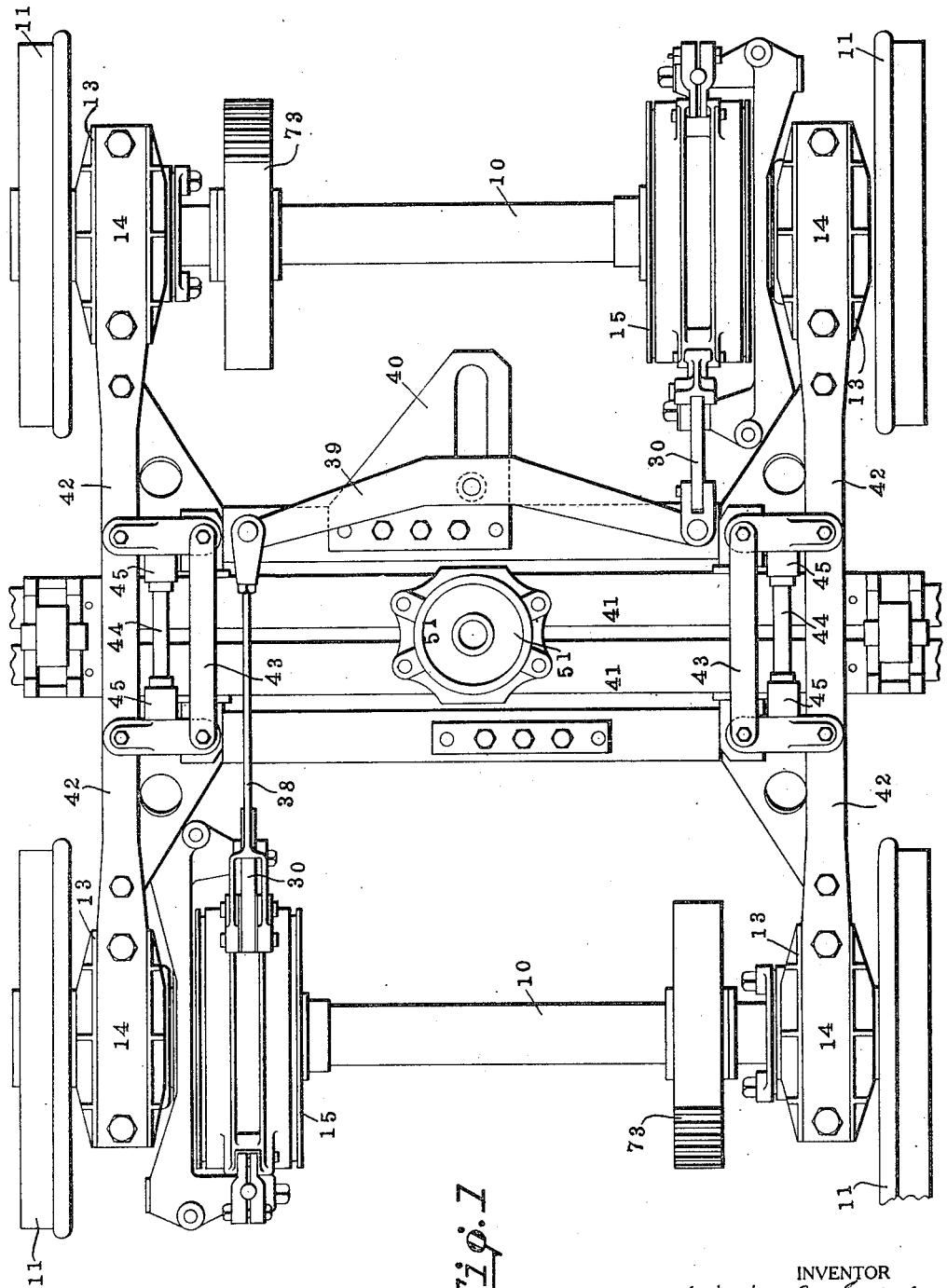
Figure 1 is a top plan view of a car truck constructed in accordance with the invention.

Referring now to the drawings, 10 denotes an axle having car wheels 11 rigidly secured to its extremities. Each truck, as shown, has a pair of axles which are journaled in suitable bearings disposed "inside" or between the wheels 11 and carried by journal housings 13, the latter being secured in the truck frame 14 so as to carry the axles in transverse relation thereto. Secured on the axle 10, preferably inside the journal housing 13, is a brake drum 15. As shown in Fig. 1 there preferably is but one brake drum on an axle, the brake drum being disposed adjacent the left-hand journal housing.

A brake rod 38 is also shown in Fig. 1 for moving the brake-shoe actuating lever 30, the rod being connected to the equalizing lever 39, which is slidingly pivoted in the bracket 40 secured to a suitable transverse portion of the frame 14.

The truck of this invention has a car supporting means, preferably of the swinging type, to accomplish which the frame 14, as shown in Figs. 1 and 3, is provided with a bolster 41 arranged to be pivotally connected to the car, the bolster 41 being movably suspended from the side members 42 which carry the journal housings supporting the axles 10, as above described.

Each of the side members 42 has secured to its top portion adjacent the middle, a small flat frame 43 carrying the horizontal journal rod 44 disposed in parallel relation to the side members. From each end of the journal rod there swings a suspension bolt 45; the pair thus provided at each side of the frame have nuts 46 on their lower ends which are adapted to support a knife-edged suspension bar 47 that is arranged to extend swingingly along the side of the frame and support an end of the spring plank 48. The spring plank which is thus swingingly suspended at both ends is preferably arranged to be in stable equilibrium only when in its central and lowermost position. The bolster 41 is arranged to extend transversely of the frame 14 and of the side members 42 and in parallel relation to the spring plank 48, there being inserted between their ends the elliptical springs 49, and between their middle portions the coil springs 50. These springs in their normal distended positions thrust the bolster upwardly so that its ends contact with the under sides of the middle portion of the side members 42, which serve thereby to limit the upward movement of the bolster that the springs would otherwise effect.

These springs are provided with rocking bearing members 74 which cooperate with suitable complementary bearing members 75 and 76 which are positioned, respectively, on the upper side of the spring plank 48 and the lower side of the bolster 41, and which are shown as flat surfaces. This construction allows the springs 49 continuously to assume a position such that their axes of resistance are inclined in substantially the same direction as that of the respective suspension elements 45.

The bolster is shown as provided on its upper face with a tubular pivotal bearing member 51 which is adapted to turn in a similar cooperating member 52 on the bottom of the car proper. A pivot pin 53 extends downwardly therefrom through suitable openings in the bearing member 51 and the bolster 41. In order to prevent the car proper from becoming accidentally detached from the truck when in place, the pivot pin 53 is provided with a gravity controlled detent member 54, comprising a small plate-like latch element pivoted in a slot cut vertically in the lower end of the pin 53 and having a projection 55 adapted to rest on a wall formation 56 bounding a portion of the slot in the pin. When the projection 55 rests upon the formation 56 it extends outwardly from the surface of pin 53 and forms an effectual stop to any upward movement of the pin out through the openings in the bolster 41 and the bearing member 51. The member 54 has also a lower depending portion 57 adapted to hold the projection in place and in addition to serve as the means adapted to receive motion for moving the projection away from its projecting position and thereby permit an easy removal of the pivot pin from its normal position. This depending portion is adapted to be moved at will by the pivotal plate 58, mounted on a suitable transverse portion 59 of the bolster 41, and having an actuating rod 60 extending as shown to the left-hand end of the bolster, the rod being provided with a manual grip 61 and with the indented portion 62 arranged to cooperate with a suitable projection 63 on the bolster for preventing accidental displacement of the rod.

At its outside ends the bolster 41 is provided with brackets 65 supporting anti-friction rollers 66. These anti-friction rollers are adapted to engage with bearing strips 67 placed on the bottom of the car in case it should rock sufficiently to engage with the anti-friction rollers, said bearing strips being so formed and positioned as to give line contact with the rollers 66. In order to decelerate and cushion the downward and upward movement of the bolster, particularly the upward movement, when the car is being loaded and unloaded respectively and thereby avoid banging against the middle portion of side members 42, the bolster is provided with a laterally projecting tongue 68 which is arranged to compress one of a pair of springs according to the direction of its motion, which are shown at 69 and 69' disposed respectively below and above the tongue. These springs are retained by a bolt 70 in the bracket-housing 71 secured on the under side of the cross-piece 72 which unites and holds in rigid relation the two side members 42. As will be readily understood, these cushioning springs, together with the rollers 66 and the bearing strips 67, provide a structure which minimizes the rocking movement of the truck in either a longitudinal or transverse direction with respect to the car body.

When in operation the railway car truck of this invention is applied with electric motors suspended from the axles in the usual manner; such a motor is indicated at M in Fig. 2, the axles being shown as having the usual driving gears 73 mounted thereon so that they may be driven by the motors.

The use of the spring plank enables a plurality of springs, as shown at 50, to be conveniently inserted as auxiliaries to the regular elliptical springs 49. The springs at 50 may be taken in any number or in any variety, for example, long or short springs formed as large or small helixes; the number to be taken in a given instance in the practice of this invention is such as to adapt the car for carrying a predetermined range of loads.

By this invention, the truck is also securely fastened to the car body and is not liable to be accidentally displaced therefrom by reason of any motion of the car. Should it be desired, however, to remove the car, the manual grip 61 is grasped by the hand of an attendant and the detent actuating rod 60 lifted out of engagement with the projection 63 and thrust inwardly so that it presses against the lower end of the member 54 until it moves the latter sufficiently to withdraw the projection 55, and permit suitable jacks, placed under the car proper, to be actuated to lift it free from the truck.

Fig. 4 shows the relation of a loaded car to the truck, the bolster being in a depressed position. When depressed the bolster is pushed downwardly out of engagement with the side members 42 of the truck frame 14. Since the suspension bolts 45 are swingingly mounted from the car frame, the spring plank 48 is permitted to swing from side to side with the motion of the car; but as it swings, one side becomes more elevated than the other. It therefore swings to positions of unstable equilibrium, so that there is in consequence a restoring force always tending to bring the car back through damped oscillations to the positions shown in Figs. 3 and 4. This permits the car truck to ride the rails with freedom and with relatively little interference from the motion of the car but yet permits the car to have an easy motion so that it gives a pleasant riding sensation.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a railway truck, the combination with a truck frame provided with side members having journal housings and axles carrying car wheels mounted therein, of a swinging car supporting means having a bearing member adapted to receive a pivot pin, said pivot pin having a detent to prevent its accidental displacement from said bearing member, and manually actuated means operatively disposed on said car supporting means to actuate said detent to permit the removal of the car from the truck at will.

2. In a railway truck, the combination with a truck frame provided with side members having rigid journal housings and axles having car wheels mounted therein, of a resiliently mounted bolster member swingingly suspended from said side members and provided with a tubular bearing member adapted to receive a pivot-pin provided with a gravity controlled detent normally projecting to prevent accidental withdrawal from said pivot-pin, a pivotal plate on said bolster member arranged when thrust inwardly to engage with said detent to enable the pivot-pin to be withdrawn from the tubular bearing, and an actuating rod provided with a detent to prevent accidental displacement connected to said plate and arranged to be manually actuated from an end of said bolster.

3. A railway truck, including side members, a spring plank, a bolster above the same and to be pivotally connected with a car frame, suspension elements having their lower ends swingingly connected to said plank, their bodies extending upwardly and inwardly, their upper ends being swingingly connected to said side members, and springs interposed between said plank and bolster, said springs being so mounted as to have their axes of resistance at all times inclined substantially in the same direction as said suspension elements during swinging movement thereof.

4. A railway truck, including side members, a transverse supporting member to be pivotally connected with a car frame, suspension elements swingingly connecting said supporting member and said side members, and a pair of springs disposed in opposed relationship and associated with said supporting member and acting to maintain the latter against swinging movements with respect to said side members, said springs being so mounted as to have their axes of resistance at all times inclined substantially in the same direction as said suspension elements during swinging movement thereof.

5. A railway truck, including side members, a transverse supporting member to be pivotally connected with a car frame, suspension elements having their lower ends swingingly connected to said supporting member adjacent its outer ends, their bodies extending upwardly at opposed angles and being swingingly connected at their upper ends to said side members, and opposed springs cooperating with said supporting member to normally maintain the same against swinging movements with respect to said side members, said springs being so mounted as to have their axes of resistance at all times inclined substantially in the same direction as said suspension elements during swinging movement thereof.

6. A railway truck, including side members, a transverse supporting member to be pivotally connected with a car frame, suspension elements having their lower ends swingingly connected to said supporting member adjacent its outer ends, their bodies extending upwardly at opposed angles and being swingingly connected at their upper ends to said side members, and a pair of springs associated with said supporting member and having their axes of resistance inclined in the same direction as the inclination of said suspension elements at all times during the swinging movement thereof, said springs acting to maintain said supporting member in predetermined position with respect to said side members.

7. A railway truck, including a pair of side members, a spring plank extending between the same, a bolster above said plank, suspension elements swingingly connecting said side members with said plank, a pair of leaf springs interposed between the ends of, and a coil spring interposed between the central portions of, said bolster and spring plank.

8. A railway truck, including side members, a supporting member extending between the same, and suspension elements connected with said side members and supporting member, certain of said connections including a pair of members having engaging surfaces, one of said surfaces presenting a raised portion, the other of said surfaces being substantially flat whereby said supporting member may rock freely with respect to said side members.

9. A railway truck, including side members, a supporting member extending between the same, suspension elements connected with said side members and supporting member, certain of said connections comprising a block associated with said supporting member and having a knife edge surface extending downwardly therefrom, and a member presenting a substantially flat surface cooperating with the latter surface of said block and associated one with each of said suspension elements whereby to swingingly suspend said supporting member from said side members.

10. A railway truck, including, in combination, a car body, a bolster pivotally secured thereto, wheels connected with said bolster, and cooperating cushioning elements and rollers associated with said car body and bolster, the surfaces of the cushioning elements which cooperate with said rollers receding toward the ends of their bodies, and being so positioned as to provide line contact with said rollers.

11. A railway truck, including, in combination, a car body, a pivot pin extending downwardly therefrom, a bolster, wheels connected with the latter, said bolster being formed with an opening, means associated with said pin and acting automatically to prevent a retraction of the same from said bolster opening upon said pin being inserted through said opening, and manually-actuated means for releasing said locking means.

12. A railway truck, including side members, a spring plank, a bolster above the same adapted to be connected with a car frame, suspension elements having their lower ends swingingly connected to said plank, their bodies extending upwardly and inwardly, their upper ends being swingingly connected to said side members, and springs interposed between said plank and bolster, said springs being so mounted as to have their axes of resistance at all times inclined substantially in the same direction as said suspension elements during swinging movement thereof.

13. A railway truck, including side members, a transverse supporting member adapted to be pivotally connected with a car frame, suspension elements having their lower ends swingingly connected to said supporting member adjacent its outer ends, their bodies extending upwardly at opposed angles and being swingingly connected at their upper ends to said side members, a pair of springs mounted between said supporting member and said side members and having rocking bearings cooperating with each thereof wherby the axes of resistance of the springs are at all times inclined substantially in the same direction as the inclination of said suspension elements.

14. A railway truck, including side members, a transverse supporting member adapted to be pivotally connected with a car frame, suspension elements having their lower ends swingingly connected to said supporting member adjacent its outer ends, their bodies extending upwardly at opposed angles and being swingingly connected at their upper ends to said side members, a pair of springs mounted between said supporting member and said side members and having rocking bearings cooperating with each thereof whereby the axes of resistance of the springs are at all times inclined substantially in the same direction as the inclination of said suspension elements, said springs acting to maintain said supporting member in predetermined position with respect to said side members.

15. A railway truck, including in combination, a car body, a bolster pivotally secured thereto, wheels connected with said bolster, and cooperating cushioning elements and rollers associated with said car body and bolster, the surfaces of the cushioning elements which cooperate with said rollers receding toward the ends of their bodies, said bolster having a laterally-projecting tongue, said tongue being positioned between a pair of springs mounted on the bolster which operate to resist downward and upward movement of the bolster.

In testimony whereof I affix my signature.

WILLIAM JUDSON SMITH.